US011809009B2

(12) United States Patent
Gross et al.

(10) Patent No.: US 11,809,009 B2
(45) Date of Patent: *Nov. 7, 2023

(54) OUTSIDE PLANT DATA COMMUNICATION SYSTEMS

(71) Applicant: Telect, Inc., Liberty Lake, WA (US)

(72) Inventors: Donald Gross, Raleigh, NC (US); Iuliu Cosmin Gordea, Liberty Lake, NC (US)

(73) Assignee: Telect, Inc., Liberty Lake, WA (US)

(*) Notice: Subject to any disclaimer, the term of this patent is extended or adjusted under 35 U.S.C. 154(b) by 64 days.

This patent is subject to a terminal disclaimer.

(21) Appl. No.: 17/347,057

(22) Filed: Jun. 14, 2021

(65) Prior Publication Data

US 2021/0373269 A1    Dec. 2, 2021

Related U.S. Application Data

(63) Continuation of application No. 16/598,974, filed on Oct. 10, 2019, now Pat. No. 11,036,020.

(51) Int. Cl.
    *G02B 6/44* (2006.01)
(52) U.S. Cl.
    CPC ................... *G02B 6/4455* (2013.01)
(58) Field of Classification Search
    None
    See application file for complete search history.

(56) References Cited

U.S. PATENT DOCUMENTS

| 4,848,859 | A  | 7/1989  | Edmonds et al. |
|-----------|----|---------|----------------|
| 5,323,480 | A  | 6/1994  | Mullaney et al. |
| 5,339,379 | A  | 8/1994  | Kutsch et al. |
| 5,546,495 | A  | 8/1996  | Bruckner et al. |
| 6,208,796 | B1 | 3/2001  | Williams Vigliaturo |
| 6,674,952 | B2 | 1/2004  | Howell et al. |
| 6,748,155 | B2 | 6/2004  | Kim et al. |
| 6,792,190 | B2 | 9/2004  | Xin et al. |
| 6,855,558 | B1 | 2/2005  | Hattori |
| 7,509,016 | B2 | 3/2009  | Smith et al. |
| 7,873,252 | B2 | 1/2011  | Smrha et al. |
| 8,280,216 | B2 | 10/2012 | Cooke et al. |
| 8,326,107 | B2 | 12/2012 | Cooke et al. |

(Continued)

FOREIGN PATENT DOCUMENTS

| WO | WO2016168337 A1 | 10/2016 |
| WO | WO2018089347    | 5/2018 |

(Continued)

OTHER PUBLICATIONS

U.S. Appl. No. 15/363,016 , filed Nov. 29, 2016, Campbell et al., Slidable telecommunications tray with cable slack management.

(Continued)

*Primary Examiner* — Michael Stahl
(74) *Attorney, Agent, or Firm* — Lee & Hayes, P.C.

(57) ABSTRACT

A data communication system for deploying outside plant fiber optics includes a cassette releasably engageable in a tray pivotably connectable to a tray fastening member disposed in an inside of an enclosure. A test port in the cassette is accessible without pivoting the tray and without pivoting any one or more trays pivotably connected to the tray fastening member.

20 Claims, 6 Drawing Sheets

(56) References Cited

U.S. PATENT DOCUMENTS

| | | | |
|---|---|---|---|
| 8,452,148 B2 | 5/2013 | Cooke et al. | |
| 8,625,950 B2 | 1/2014 | Beamon et al. | |
| 8,712,206 B2 | 4/2014 | Cooke et al. | |
| 9,097,872 B2 | 8/2015 | Seo et al. | |
| 9,128,262 B2 | 9/2015 | Campbell et al. | |
| 9,250,409 B2 | 2/2016 | Blackwell, Jr. et al. | |
| 9,258,916 B2 | 2/2016 | Lu et al. | |
| 9,389,384 B2 | 7/2016 | Solheid et al. | |
| 9,470,868 B2 | 10/2016 | Ellison et al. | |
| 9,523,833 B2 | 12/2016 | Campbell et al. | |
| 9,541,726 B2 | 1/2017 | Geens et al. | |
| 9,690,065 B2 | 6/2017 | Wiltjer et al. | |
| 9,823,432 B2 | 11/2017 | Alexi et al. | |
| 9,829,642 B2 | 11/2017 | Geens et al. | |
| 9,829,666 B2 | 11/2017 | Ellison et al. | |
| 10,012,813 B2 | 7/2018 | Petersen et al. | |
| 10,025,055 B2 | 7/2018 | Alexi et al. | |
| 10,101,542 B2 | 10/2018 | Kostecka et al. | |
| 10,175,441 B2 | 1/2019 | Ellison et al. | |
| 10,203,465 B2 | 2/2019 | Krampotich et al. | |
| 10,209,470 B2 | 2/2019 | Geling et al. | |
| 10,254,496 B2 | 4/2019 | Geens et al. | |
| 10,502,917 B2 | 12/2019 | Geens et al. | |
| 10,514,518 B1 | 12/2019 | Livingston et al. | |
| 10,718,920 B2 | 7/2020 | Ellison et al. | |
| 10,795,107 B2 | 10/2020 | Pilon | |
| 2009/0310927 A1 | 12/2009 | Riggsby et al. | |
| 2009/0324189 A1 | 12/2009 | Hill et al. | |
| 2010/0054684 A1 | 3/2010 | Cooke et al. | |
| 2010/0142910 A1 | 6/2010 | Hill et al. | |
| 2010/0322583 A1* | 12/2010 | Cooke ................ | G02B 6/4452 385/135 |
| 2012/0114295 A1 | 5/2012 | Guzzo et al. | |
| 2012/0243845 A1 | 9/2012 | Wright et al. | |
| 2012/0328258 A1 | 12/2012 | Barron et al. | |
| 2013/0105420 A1 | 5/2013 | Ray et al. | |
| 2013/0108225 A1 | 5/2013 | Ray et al. | |
| 2014/0086545 A1 | 3/2014 | Solheid et al. | |
| 2014/0219615 A1 | 8/2014 | Petersen et al. | |
| 2014/0241691 A1 | 8/2014 | Solheid et al. | |
| 2014/0248028 A1 | 9/2014 | Campbell et al. | |
| 2014/0354131 A1 | 12/2014 | Takeuchi et al. | |
| 2015/0063772 A1 | 3/2015 | Beamon et al. | |
| 2015/0117829 A1 | 4/2015 | Allen | |
| 2015/0212286 A1 | 7/2015 | Vongseng et al. | |
| 2015/0241654 A1 | 8/2015 | Allen et al. | |
| 2015/0309674 A1 | 10/2015 | Williams et al. | |
| 2016/0033732 A1 | 2/2016 | Giraud et al. | |
| 2016/0047999 A1 | 2/2016 | Alexi et al. | |
| 2016/0062068 A1 | 3/2016 | Giraud et al. | |
| 2016/0077298 A1 | 3/2016 | Wiltjer et al. | |
| 2016/0219748 A1 | 7/2016 | Tsai et al. | |
| 2016/0238811 A1 | 8/2016 | Simmons et al. | |
| 2016/0370552 A1 | 12/2016 | Lambourn et al. | |
| 2017/0293100 A1 | 10/2017 | Solheid et al. | |
| 2018/0157000 A1 | 6/2018 | Bakatsias et al. | |
| 2018/0224621 A1 | 8/2018 | Campbell et al. | |
| 2019/0004268 A1 | 1/2019 | Vogel | |
| 2019/0302388 A1 | 10/2019 | Ellison et al. | |
| 2019/0317292 A1 | 10/2019 | Ellison et al. | |
| 2020/0057226 A1 | 2/2020 | Sievers et al. | |
| 2020/0081216 A1 | 3/2020 | Takeuchi et al. | |
| 2021/0109304 A1 | 4/2021 | Gross et al. | |
| 2021/0165181 A1 | 6/2021 | Ellison et al. | |

FOREIGN PATENT DOCUMENTS

| | | |
|---|---|---|
| WO | WO2018089359 | 5/2018 |
| WO | WO2018089367 | 5/2018 |

OTHER PUBLICATIONS

"Arris Optical Passives DP95Dxx data sheet", retrieved from «https://mktg-webtesttext.arris.com/globalassets/resources/data-sheets/dp95dxx.pdf», Mar. 2019, 7 pgs.

"Commscope Fiber Optic Splice Closure Trays : A and B Size Installation Instruction", retrieved from «https://www.commscope.com/globalassets/digizuite/56226-eng-ss-f149-b-a-b-tray-installation-instructions-11-18-19-pdf.pdf.», 2016, 6 pgs.

"Commscope FOSC 450 Gel Sealed Fiber Optic Splice Closure 2017 Product Ordering Guide (3rd Edition)", retrieved from <<https://www.commscope.com/glbalassets/digizuite/2590-fosc-450-fiber-splice-closures-ca-110912-en.pdf>>, Feb. 2017, 40 pgs.

Office Action for U.S. Appl. No. 16/462,898, dated Feb. 19, 2021, Ellision, "Fiber Cassette", 8 Pages.

Office Action for U.S. Appl. No. 16/462,898, dated Jul. 21, 2020, Ellision, "Fiber Cassette", 7 Pages.

Office Action for U.S. Appl. No. 16/598,974, dated Oct. 13, 2020, Gross, "Outside Plant Data Communication Systems", 15 Pages.

"ICC. Slide-Out Fiber Optic Rack Mount Enclosures. Installation Instructions", Dec. 3, 2014, retrieved from the Internet on Feb. 23, 2018 from URL:https://web/archive.org/web/20150508202907/http://www.icc.com/docs/install/ICFORET31RM-62RM-T4RM-MSR-0521-RevA.pdf.

PCT Invitation to Pay Additional Fees dated Jan. 17, 2018 for PCT Application No. PCT/US17/60360, 2 pages.

PCT Search Report and Written Opinion dated Jan. 4, 2018 for PCT Application No. PCT/US17/60391, 8 pages.

PCT Search Report and Written Opinion dated Jan. 4, 2018 for PCT Application No. PCT/US17/60406, 8 pages.

PCT Search Report and Written Opinion dated Apr. 5, 2018 for PCT application No. PCT/US2017/060360, 13 pages.

* cited by examiner

OUTSIDE PLANT DATA COMMUNICATION SYSTEMS

RELATED APPLICATIONS

This application claims priority to and is a continuation of U.S. patent application Ser. No. 16/598,974, filed on Oct. 10, 2019, the entire contents of which are incorporated herein by reference.

BACKGROUND

An important consideration in data communication equipment is circuit density. Most fiber optic splice closures have limited space. Therefore, there is a need to reduce the size of data communication equipment and install as much data communication equipment as possible in a relatively small space in fiber optic splice closures.

For data communication manufacturers, making high density trays can be a challenging process in which engineers develop trays to meet the high density needs of the fiber optic splice closures while protecting optical fiber lines, maintaining bend radii of the optical fiber lines, and managing massive amounts of the optical fiber lines. This is particularly true for optical fiber lines, where the engineers create trays having a high density of optical fibers.

Another important consideration in data communication equipment is testing of filters (e.g., wavelength management filters, coarse wavelength division multiplexing (CWDM) filters, dense wavelength division multiplexing (DWDM) filters, etc.) and/or testing filters to maintain and/or troubleshoot wavelengths of multiple colors on a single fiber. Existing fiber optic splice closures can require accessing a tray to gain access to connectors connecting the fiber optic lines disposed in the tray. For example, existing fiber optic closures can require displacing one or more trays of a plurality of trays to gain access to a particular tray to be tested. After gaining access to the particular tray to be tested, optical fibers, filters, connectors, etc. may be displaced to gain access to a connector to test a filter. Subsequent to testing the filter, the optical fibers, filters, connectors, etc. are disposed back into the particular tray, and all of the trays are displaced back into to a stowed position. Because testing a filter can require accessing a particular tray to gain access to connectors disposed in the particular tray, this increases an amount of work to test a filter, thereby reducing margins by increasing the cost of installing, upgrading, and/or troubleshooting data communication equipment. Moreover, because the fiber optic splice closures may be used in an outside plant environment (e.g., in overhead lines, in overhead cable lines, in underground enclosures, in handholes, etc.), testing of filters can occur in adverse conditions. Because testing a filter can occur in adverse conditions, this increases an amount of difficulty in testing filters, thus further increasing the amount of work to test the filter, thereby further reducing margins by further increasing the cost of installing, upgrading, and/or troubleshooting data communication equipment. Therefore, there is a desire to maximize margins by decreasing a cost of installing, upgrading, and/or troubleshooting data communication equipment by making them easily field testable.

SUMMARY

Data communication systems are described which are configured for deploying outside plant fiber optics associated with a switch (e.g., a demultiplexer (DEMUX)). This summary is provided to introduce simplified concepts of data communication systems, which are further described below in the Detailed Description. This summary is not intended to identify essential features of the claimed subject matter, nor is it intended for use in determining the scope of the claimed subject matter.

In an embodiment, a data communication system includes a tray pivotably connectable to a tray fastening member disposed in an inside of an enclosure. The enclosure may include one or more trays pivotably connected to the tray fastening member. A cassette may be releasably engaged in the tray. The cassette may include a first connector fastening station arranged in a first end of the cassette and the first connector fastening station may include a first plurality of receptacles fastening a plurality of optical fiber interfaces. The cassette may include a second connector fastening station arranged in a second end of the cassette and the second connector fastening station may include a second plurality of receptacles fastening at least one test port. The configuration of the cassette having the test port arranged in the second end of the cassette and the tray pivotably connected to the tray fastening member may provide for an engineer to applying a test signal to the test port of to test a filter disposed in the cassette without pivoting the tray or any of the one or more trays pivotably connected to the tray fastening member, and without accessing (e.g., opening) the cassette.

In another embodiment, a data communication system includes an enclosure including a tray fastening member disposed in an inside of the enclosure. The tray includes a connecting member disposed at a first end of the tray for pivotably connecting to the tray fastening member, a first locking mechanism on a first side of the tray, and a second locking mechanism on the second side of the tray. A cassette may be releasably engaged in the tray. The cassette includes a first locking mechanism on a first side of the cassette and a second locking mechanism on a second side of the cassette. The first locking mechanism on the first side of the tray may be releasably engageable with the first locking mechanism on the first side of the cassette, and the second locking mechanism on the second side of the tray may be releasably engageable with the second locking mechanism on the second side of the cassette. Because the cassette may be releasably engaged in the tray, the cassette is quickly and easily replaceable. Moreover, because the cassette may be releasably engaged in the tray, the cassette is positively engaged in the tray in a correct orientation relative to the enclosure.

In another embodiment, a data communication system includes a tray pivotably connectable to a tray fastening member disposed in an inside of an enclosure. A height of the tray may range from about 0.4 inches to about 0.6 inches. A cassette may be releasably engageable in the tray. A height of the cassette may range from about 0.4 inches to about 0.6 inches. Because the height of the cassette is about the same as the height of the tray, the releasably engaged cassette and tray assembly may be disposed in a space designated for a standard tray (e.g., a space designated for a standard splice tray of a fiber optic splice closure (FOSC)).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
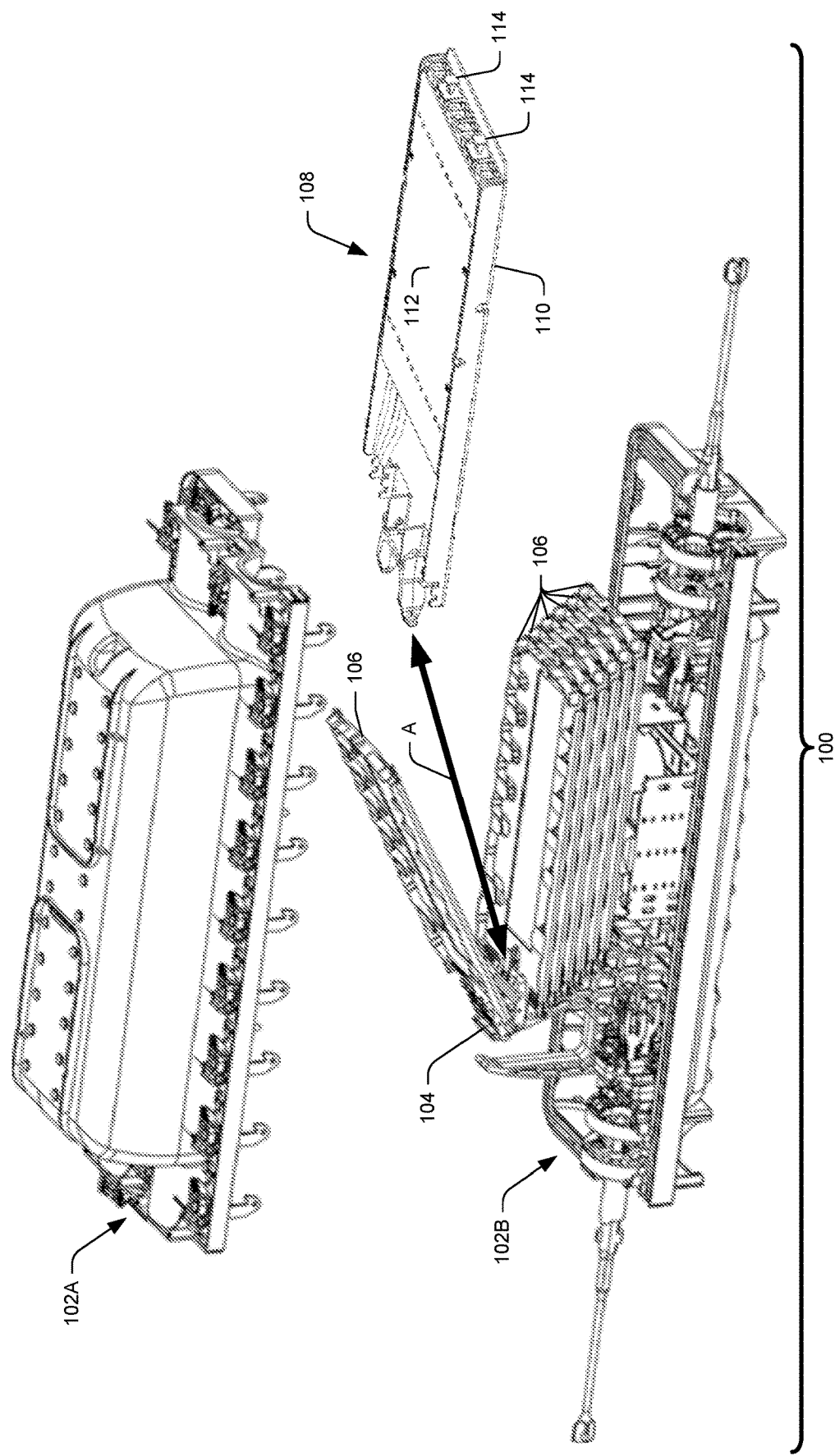
FIG. 1 illustrates an example outside plant data communication system according to an embodiment of this disclosure.

This disclosure is directed to data communication systems having a cassette and a tray. The cassette may be releasably engageable in the tray. The tray is pivotably connectable to a tray fastening member disposed in an inside of an enclosure (e.g., closure, fiber optic splice closure (FOSC), etc.) and the cassette includes a plurality of test ports to allow for testing filters (e.g., wavelength management filters, coarse wavelength division multiplexing (CWDM) filters, dense wavelength division multiplexing (DWDM) filters, etc.) in the cassette without pivoting any trays pivotably connected to the tray fastening member and without accessing (e.g., opening) the cassette. While the disclosure describes "a" or "the" data communication system, the article (e.g., "a," "an," or "the") used preceding "data communication system" is not intended to indicate a limitation of the features of the system itself, unless otherwise so stated. Indeed, multiple embodiments of a data communication system may be possible by using one or more of the various features and concepts in varying implementations and/or combinations. For example, while the figures may depict an embodiment of a data communication system disposed in an outside plant enclosure associated with a demultiplexer (DEMUX), it is contemplated that one or more features and concepts described herein as related to the data communication system may be implemented in other embodiments, such as, for example, an embodiment of the features for testing filters in an inside plant environment and/or an embodiment of the features for testing filters associated with a multiplexer (MUX). Moreover, while the disclosure describes the data communication system configured to test filters, the data communication system may be configured for any fiber connectivity and/or fiber management (e.g., splitting wavelength, splitting power, splicing, patching, test ports, patch ports, etc.), for example.

A data communication system as disclosed herein may include a tray pivotably connectable to a tray fastening member (e.g., tray tower) disposed in an inside of an enclosure. The enclosure may include one or more trays (e.g., one or more splice trays) pivotably connected to the tray fastening member. A cassette may be releasably engaged in the tray. The cassette may include a plurality of optical fiber interfaces fastened in a plurality of receptacles of a first connector fastening station arranged in a first end of the cassette. The cassette may include a plurality of test ports fastened in a plurality of receptacles of a second connector fastening station arranged in a second end of the cassette. The plurality of test ports are accessible to test filters in the tray without pivoting the tray, without pivoting any of the one or more trays, or accessing the cassette.

A data communication system as disclosed herein may include a tray including a connecting member disposed at a first end of the tray for pivotably connecting to a tray fastening member of an enclosure. The tray may include a first locking mechanism on a first side of the tray and a second locking mechanism on a second side of the tray. A cassette releasably engaged in the tray may include a first locking mechanism on a first side of the cassette and a second locking mechanism on a second side of the cassette. The first locking mechanism of tray is releasably engageable with the first locking mechanism of the cassette, and the second locking mechanism of the tray is releasably engageable with the second locking mechanism of the cassette to positively engage the cassette in the tray in a correct orientation relative to the enclosure.

A data communication system as disclosed herein may include a tray having a height ranging from about 0.4 inches to about 0.6 inches. A cassette releasably engageable in the tray may have about the same height as the tray ranging from about 0.4 inches to about 0.6 inches. The cassette may be modular and configured for a particular type of enclosure. The cassette may positively engage in the tray which pivotably connects to a tray fastening member disposed in the particular type of enclosure.

Illustrative Embodiments of Data Communication Systems

FIG. 1 illustrates an example outside plant data communication system 100 according to an embodiment of this disclosure. The outside plant data communication system 100 may be used in overhead lines, in overhead cable lines, in underground enclosures, in handholes, etc. and may be associated with a demultiplexer (DEMUX). The outside plant data communication system 100 may include fiber optic components. For example, the outside plant data communication system 100 may include an enclosure 102A and 102B, a tray fastening member 104, and one or more trays 106. The enclosure 102A and 102B may be a closure, a fiber optic splice closure (FOSC), an "A" series FOSC, a "B" series FOSC, a "C" series FOSC, a "D" series FOSC, etc. The tray fastening member 104 may be a tower, a tray tower, etc. disposed in an inside of the enclosure 102B. The one or more trays 106 may be splice trays, patch trays, power trays, etc. pivotably connected to the tray fastening member 104. The fiber optic components may include a data communication system 108. The data communication system 108 may include a tray 110 pivotably connectable (represented by double arrowed line "A") to the tray fastening member 104 disposed in the inside of the enclosure 102B. The data communication system 108 may include a cassette 112 releasably engaged in the tray 110. The cassette may include a plurality of test ports 114 to allow for testing filters (e.g., wavelength management filters, coarse wavelength division multiplexing (CWDM) filters, dense wavelength division multiplexing (DWDM) filters, etc.) (shown in FIG. 6) in the cassette 112 without pivoting any of the one or more trays 106 or pivoting the tray 110 and without accessing (e.g., opening) the cassette 112.

Figure 2:
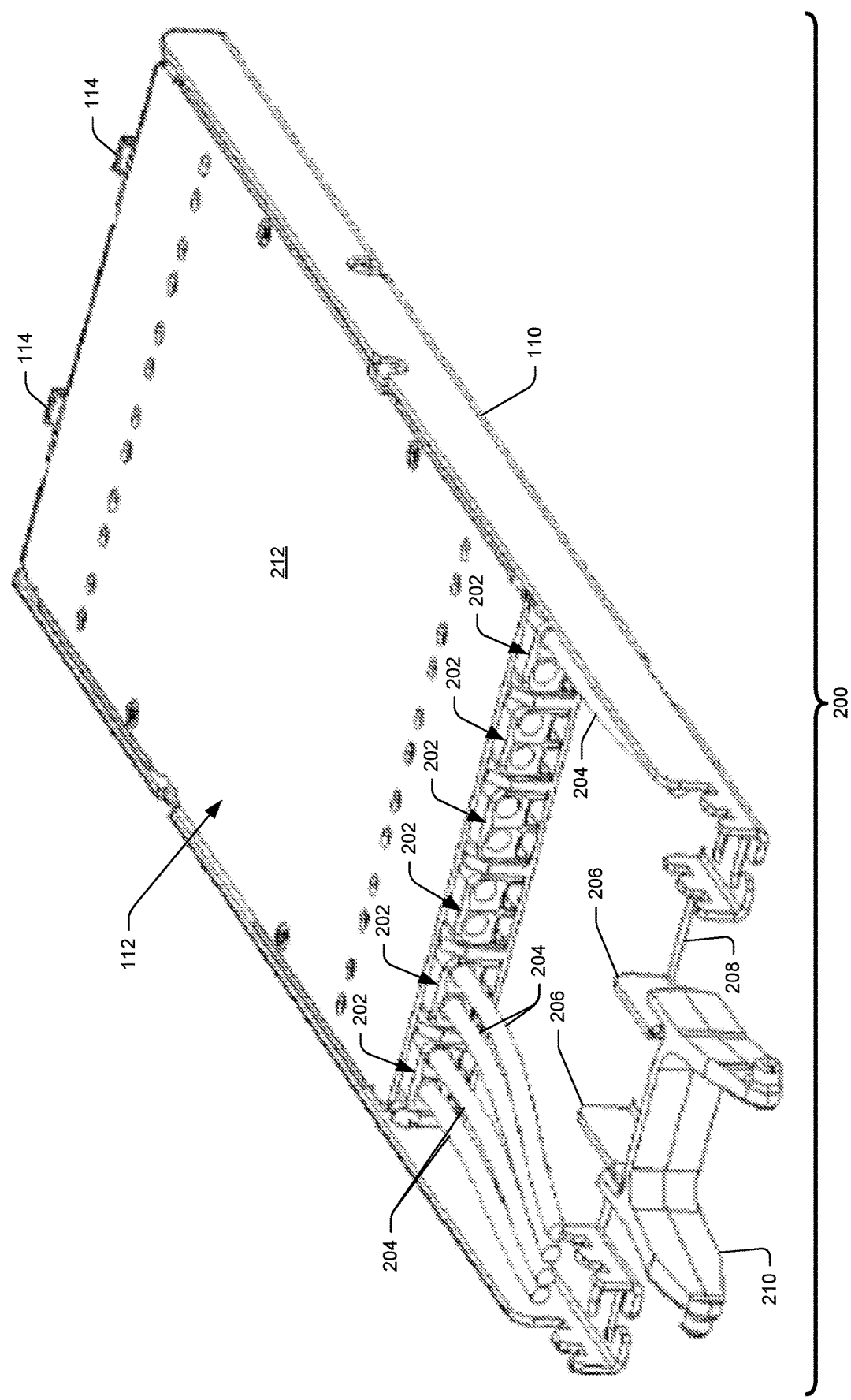
FIG. 2 illustrates an example data communication system useable in the outside plant data communication system illustrated in FIG. 1 according to an embodiment of this disclosure.

FIG. 2 illustrates an example data communication system 200 useable in the outside plant data communication system 100 illustrated in FIG. 1 according to an embodiment of this disclosure. The data communication system 200 may be the same as the data communication system 108. Inasmuch as FIG. 2 depicts the data communication system 200, while referring to the same elements and features of the data communication system 108, the following discussion of specific features may refer interchangeably to any of FIGS. 1-2 except where explicitly indicated. In particular, FIG. 2 illustrates an embodiment of the data communication system 200, including the tray 110, the cassette 112, and the plurality of test ports 114.

FIG. 2 illustrates the data communication system 200 may include a plurality of optical fiber interfaces 202. The plurality of optical fiber interfaces 202 may be fastened in a first plurality of receptacles of a first connector fastening station (described in more detail below with regard to FIGS. 3-5). Each optical fiber interface of the plurality of optical fiber interfaces 202 may be sized to receive a respective bundle of optical fibers 204. For example, a respective bundle of optical fibers 204 may include multiple individual fibers contained in a jacket as a bundle of optical fibers, and each optical fiber interface of the plurality of optical fiber interfaces 202 may be sized to receive the jacketed bundle of optical fibers. In another example, a respective bundle of optical fibers 204 may include multiple individual fibers, not contained in a jacket, and each optical fiber interface of the plurality of optical fiber interfaces 202 may be sized to receive the multiple individual fibers that are not contained in a jacket. The respective bundle of optical fibers 204 may include a quantity of about two cables of fibers. Each cable may have a diameter of about 0.1225 inches (3 mm). The respective bundle of optical fibers 204 may have a size of at least about 0.12 inches (3 mm) to at most about 0.24 inches (6 mm). Each optical fiber interface of the plurality of optical fiber interfaces 202 may have one cable to at most about two cables exiting an optical fiber interface. Thus, each optical fiber interface of the plurality of optical fiber interfaces 202 may have a size of at least about 0.12 inches to at most about 0.24 inches to receive a bundle of optical fibers. Each optical fiber interface of the plurality of optical fiber interfaces 202 may provide strain relief for each bundle of optical fibers 204 received by each optical fiber interface. This can provide for protecting the optical fibers received by the cassette 112 and/or provide for managing the plurality of optical fibers received by the cassette 112. For example, because each fiber interface of the plurality of optical fiber interfaces 202 may receive a respective bundle of optical fibers 204 this may provide for maintaining bend radii of the optical fibers in the respective bundle of optical fibers 204 and provide for managing the optical fibers in the respective bundle of optical fibers 204 with respect to individual channels.

The tray 110 may include a connecting member 206 disposed on a first end 208 of the tray 110. The connecting member 206 may be attachable to a hinge member 210 for pivotably connecting to the tray fastening member 104 disposed in the inside of the enclosure 102B. The hinge member 210 may be a first hinge member different than a second hinge member. For example, the enclosure 102A and 102B may be a first type of enclosure (e.g., "B" series fiber optic splice closure (FOSC)) having a lower tray housing capacity (e.g., about four trays (e.g., splice trays)) than a second type of enclosure (e.g., "D" series fiber optic splice closure (FOSC)) having a higher tray housing capacity (e.g., about six trays (e.g., splice trays)) than the first type of enclosure. The tray fastening member 104 may be a first tray fastening member disposed in the inside of the first type of enclosure smaller than a second tray fastening member disposed in an inside of the second type of enclosure. And, the first hinge member attaches to the connecting member 206 of the tray 110 for pivotably connecting to the first tray fastening member of the first type of enclosure, and the second hinge member attaches to the connecting member 206 of the tray 110 for pivotably connecting to the second tray fastening member of the second type of enclosure. In this way, the tray 110 may be attached (e.g., snap fit, press fit, interference fit, etc.) into enclosures having different housing capacities as desired. For example, an engineer may attach the first hinge member to the connecting member 206 of the tray 110 to pivotably attach the tray 110 to a "B" series fiber optic splice closure (FOSC) as desired, or an engineer may attach the second hinge member to the connecting member 206 of the tray 110 to pivotably attach the tray 110 to a "D" series fiber optic splice closure (FOSC) as desired.

The cassette 112 may include a cover 212. The cover 212 may be removeably attached to a top of the cassette 112. The cover 212 may enclose the cassette 112 and/or cover fiber optic components in the cassette 112.

Figure 3:
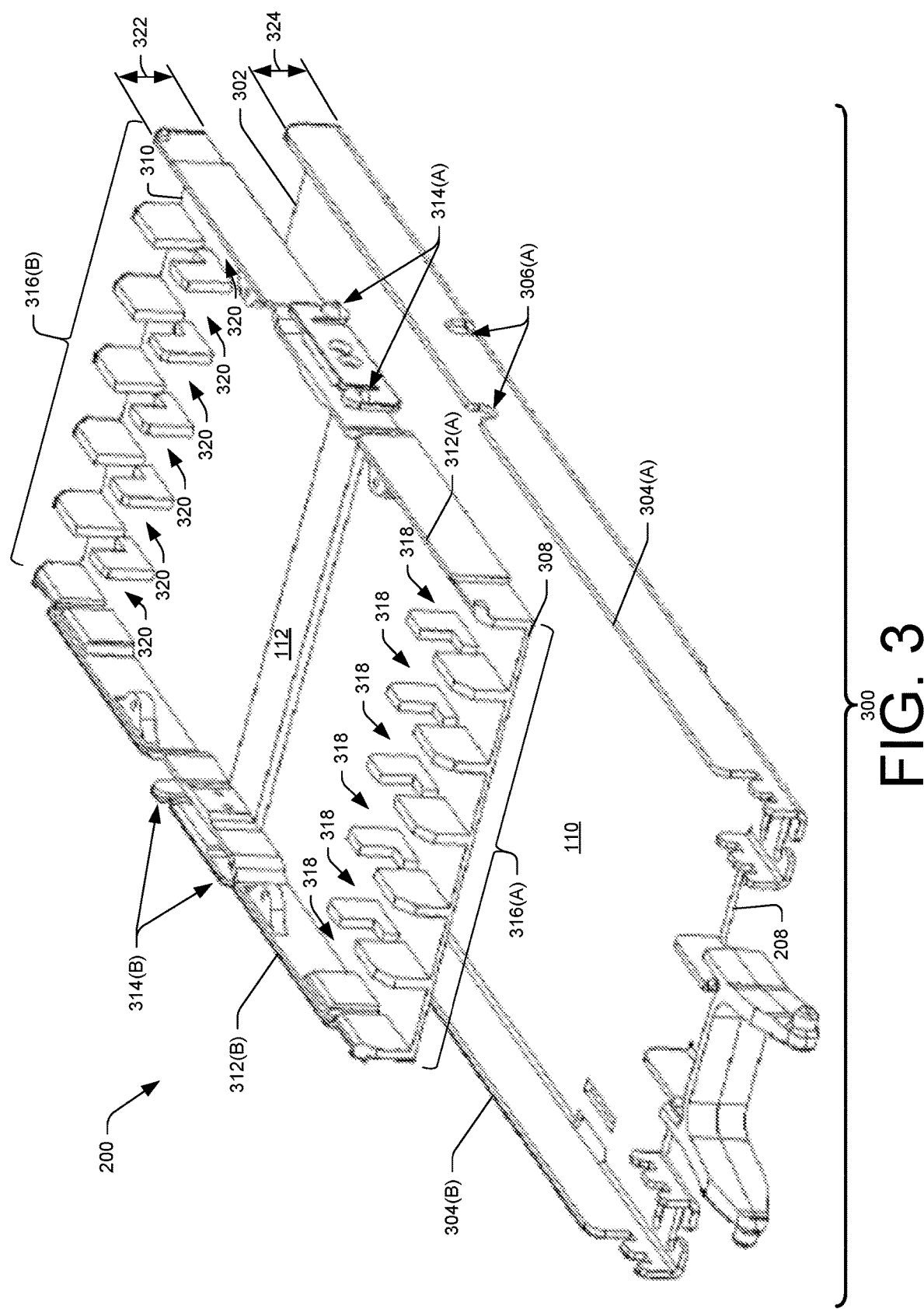
FIG. 3 illustrates an exploded assembly view of the data communication system illustrated in FIG. 2 according to an embodiment of this disclosure.

FIG. 3 illustrates an exploded assembly view 300 of the data communication system 200 illustrated in FIG. 2 according to an embodiment of this disclosure (for clarity the plurality of test ports 114, the plurality of optical fiber interfaces 202, the respective bundles of optical fiber 204, and the cover 212 are not shown). FIG. 3 illustrates the tray 110 detached from the cassette 112.

The tray 110 may have a second end 302 opposite the first end 208, a first side 304(A) arranged between the first end 208 of the tray 110 and the second end 302 of the tray 110, and a second side 304(B) arranged between the first end 208 of the tray 110 and the second end 302 of the tray 110. A first locking mechanism 306(A) may be disposed on the first side 304(A) of the tray 110, and a second locking mechanism 306(B) (illustrated in FIGS. 4-5) may be disposed on the second side 304(B) of the tray 110. The first locking mechanism 306(A) and/or the second locking mechanism 306(B) may be detents. For example, the detents may be an opening, a hole, a pocket, an aperture, a groove, a recess, etc. In another example, the detents may be a protrusion, a bump, a nodule, a ridge, etc.

The cassette 112 may have a first end 308 opposite a second end 310, a first side 312(A) arranged between the first end 308 of the cassette 112 and the second end 310 of the cassette 112, and a second side 312(B) arranged between the first end 308 of the cassette 112 and the second end 310 of the cassette 112. The first end 308 of the cassette 112 may have a first geometry symmetrical, about at least one axis, to a second geometry of the second end 310 of the cassette 112. For example, the first geometry may have a shape and relative arrangement of fastening features, structures, members, receptacles, etc. that are substantially the same as a shape and relative arrangement of fastening features, structures, members, receptacles, etc. of the second geometry. Further, the shapes and relative arrangements of fastening features, structures, members, receptacles, etc. of both of the first geometry and the second geometry may be symmetrically arranged, about an X-axis, a Y-axis, and/or a Z-axis of the cassette. For example, the first geometry may have a length, a width, a height, and a plurality of receptacles that are substantially the same as a length, a width, a height and a plurality of receptacles of the second geometry that may be symmetrically arranged about an X-axis, a Y-axis, and/or a Z-axis of the cassette. (See for example, PCT Application No. PCT/US17/60406, filed Nov. 7, 2017, entitled "Configurable Fiber Cassette," which is hereby incorporated by reference in its entirety.) The symmetry of the cassette 112 allows for the use of both of the first end 308 and the second end 310 of the cassette 112 and configure the cassette 112 based at least in part on a type of an outside plant data communication system.

A first locking mechanism 314(A) may be disposed on the first side 312(A) of the cassette 112, and a second locking mechanism 314(B) may be disposed on the second side 312(B) of the cassette 112. The first locking mechanism 306(A) on the first side 304(A) of the tray 110 may be releasably engageable (e.g., snap fit, press fit, interference fit, etc.) with the first locking mechanism 314(A) on the first side 312(A) of the cassette 112, and the second locking mechanism 306(B) on the second side 304(B) of the tray 110 may be releasably engageable (e.g., snap fit, press fit, interference fit, etc.) with the second locking mechanism 314(B) on the second side 312(B) of the cassette 112. The first locking mechanism 314(A) and/or the second locking mechanism 314(B) may be detents. For example, the detents may be a protrusion, a bump, a nodule, a ridge, etc. In another example, the detents may be an opening, a hole, a pocket, an aperture, a groove, a recess, etc.

While FIG. 3 illustrates the first locking mechanism 314(A) is a single unit of material fastened on the first side 312(A) of the cassette 112 and the second locking mechanism 314(B) is a single unit of material fastened on the second side 312(B) of the cassette 112, the first locking mechanism 314(A) and/or the second locking mechanism 314(B) may not be a single unit of material fastened on the first and second sides 312(A) and 312(B) of the cassette 112. For example, the first locking mechanism 314(A) and/or the second locking mechanism 314(B) may be formed integrally with the first and second sides 304(A) and/or 304(B) of the cassette 112.

A first connector fastening station 316(A) may be arranged in the first end 308(A) of the cassette 112. A second connector fastening station 316(B) may be arranged in the second end 310 of the cassette 112. The first connector fastening station 316(A) may include a first plurality of receptacles 318, each of the first plurality of receptacles 318 being configured to fasten at least one of a first connector, a first adapter, a first plug, or a first strain relief unit. The second connector fastening station 316(B) may include a second plurality of receptacles 320, each of the second plurality of receptacles 320 being configured to fasten at least one of a second connector, a second adapter, a second plug, or a second strain relief unit. Because the first and second connector fastening stations 316(A) and 316(B) in the cassette 112 may be populated with any one of a plurality of optical fiber interfaces (e.g., connectors, adapters, plugs, strain relief units, etc.) the cassette 112 may be modular in that the cassette 112 is easily configured based at least in part on a particular type of outside plant data communication system the cassette 112 is to be installed in by simply populating the first and second connector fastening stations 316(A) and 316(B) with a desired set of optical fiber interfaces that correlates to the particular type of outside plant data communication system.

The tray 110 may have a height 322 ranging from about 0.4 inches to about 0.6 inches. The cassette 112 may have a height 324 ranging from about 0.4 inches to about 0.6 inches. Because the height 324 of the cassette 112 is about the same as the height 322 of the tray 110, the releasably engaged cassette 112 and tray 110 assembly may be disposed in a space designated for a standard tray (e.g., a space designated for a standard splice tray of a fiber optic splice closure (FOSC)). For example, a total height of the cassette 112 releasably engaged in the tray 110 may be about the same as a height of a standard splice tray that is configured to be disposed in a fiber optic splice closure (FOSC). Because the total height of the cassette 112 releasably engaged in the tray 110 may be about the same as a height of a standard splice tray, the releasably engaged cassette 112 and tray 110 assembly may be disposed in the space designated for the standard splice tray in the fiber optic splice closure (FOSC). Because the releasably engaged cassette 112 and tray 110 assembly may be disposed in the space designated for the standard splice tray in the fiber optic splice closure (FOSC), the releasably engaged cassette 112 and tray 110 assembly allows for retrofitting an existing fiber optic splice closure (FOSC). For example, the releasably engaged cassette 112 and tray 110 assembly may be disposed in the space designated for the standard splice tray in the fiber optic splice closure (FOSC) to retrofit an existing fiber optic splice closure (FOSC) to include more sophisticated filters (e.g., wavelength management filters, coarse wavelength division multiplexing (CWDM) filters, dense wavelength division multiplexing (DWDM) filters, etc.) in an existing outside plant data communication system.

Figure 4:
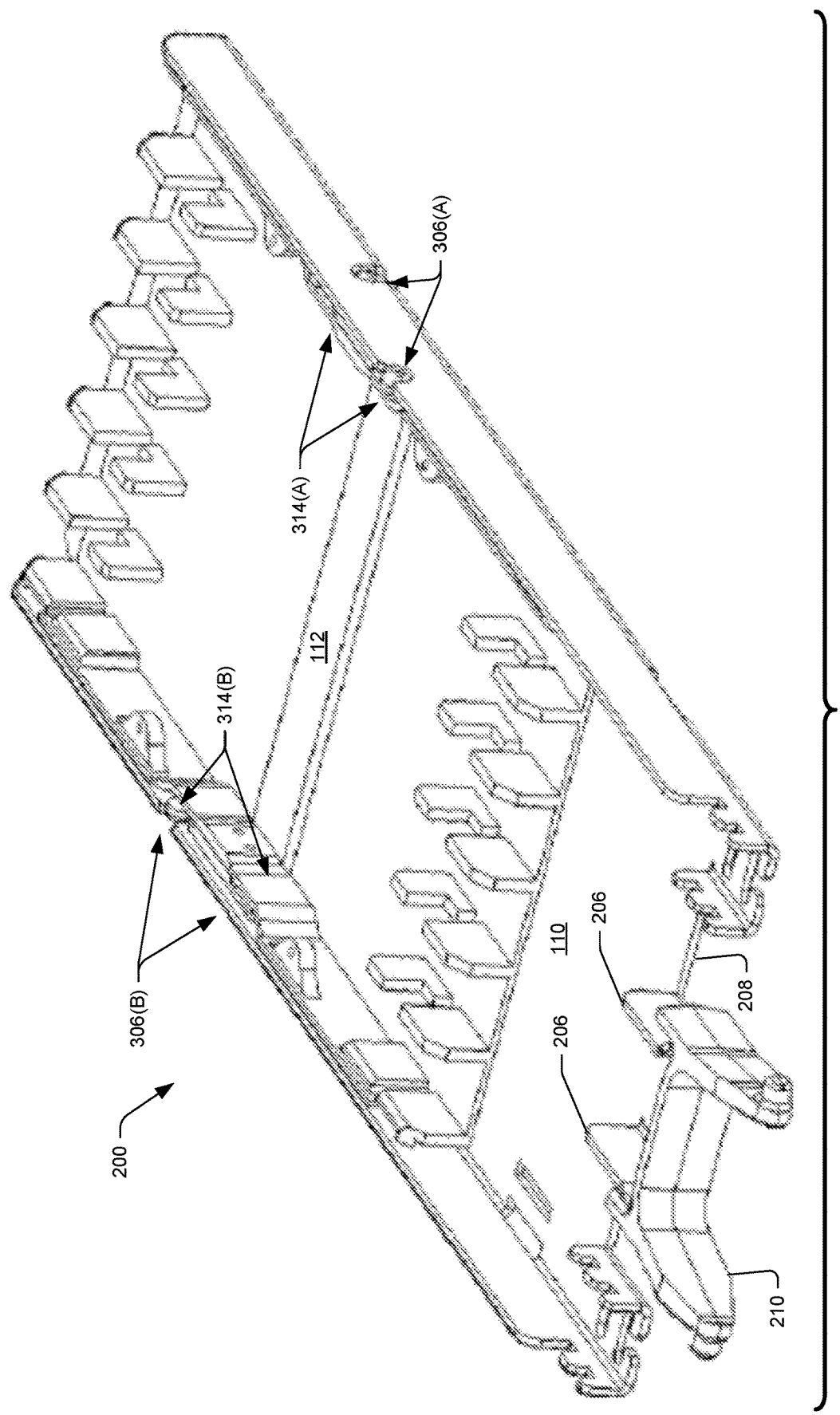
FIG. 4 illustrates an example assembled view of the data communication system illustrated in FIG. 3 according to an embodiment of this disclosure.

FIG. 4 illustrates an example assembled view 400 of the data communication system 200 illustrated in FIG. 3 according to an embodiment of this disclosure. FIG. 4 illustrates the tray 110 releasably engaged with the cassette 112. For example, the first locking mechanism 306(A) on the first side 304(A) of the tray 110 is releasably engaged with the first locking mechanism 314(A) on the first side 312(A) of the cassette 112, and the second locking mechanism 306(B) on the second side 304(B) of the tray 110 is releasably engageable with the second locking mechanism 314(B) on the second side 312(B) of the cassette 112. Because the cassette 112 is releasably engaged in the tray 110, the cassette 112 is positively engaged in the tray 110 in a correct orientation relative to the first end 208 of the tray 110, and the first end 208 of the tray 110 pivotably connects, via the connecting member 206 and the hinge member 210, to the tray fastening member 104 disposed in the inside of the enclosure 102B. Because the cassette 112 is positively engaged in the tray 110 in a correct orientation relative to the first end 208 of the tray 110, when an engineer proceeds to install the positively engaged cassette 112 and tray 110 assembly in overhead lines, in overhead cable lines, in underground enclosures, in handholes, etc., the positively engaged cassette 112 and tray 110 assembly ensures the correct orientation during installation in the field. Further, because the cassette 112 is releasably engaged in the tray 110, the cassette 112 is quickly and easily replaceable. Moreover, because the hinge member 210 on the first end 208 of the tray 110 is attached (e.g., snap fit, press fit, interference fit, etc.) to the tray fastening member 104 disposed in the inside of the enclosure 102B, the positively engaged cassette 112 and tray 110 assembly may be quickly and easily replaceable. Still further, because the cassette 112 is positively engaged in tray 110 the positively engaged cassette 112 and tray 110 assembly is more robust and more capable of enduring harsh environmental conditions, as well as being more capable of being mounted in different orientations than existing trays using hook-and-loop fasteners, adhesive fasteners, adhesive tape fasteners, etc.

Figure 5:
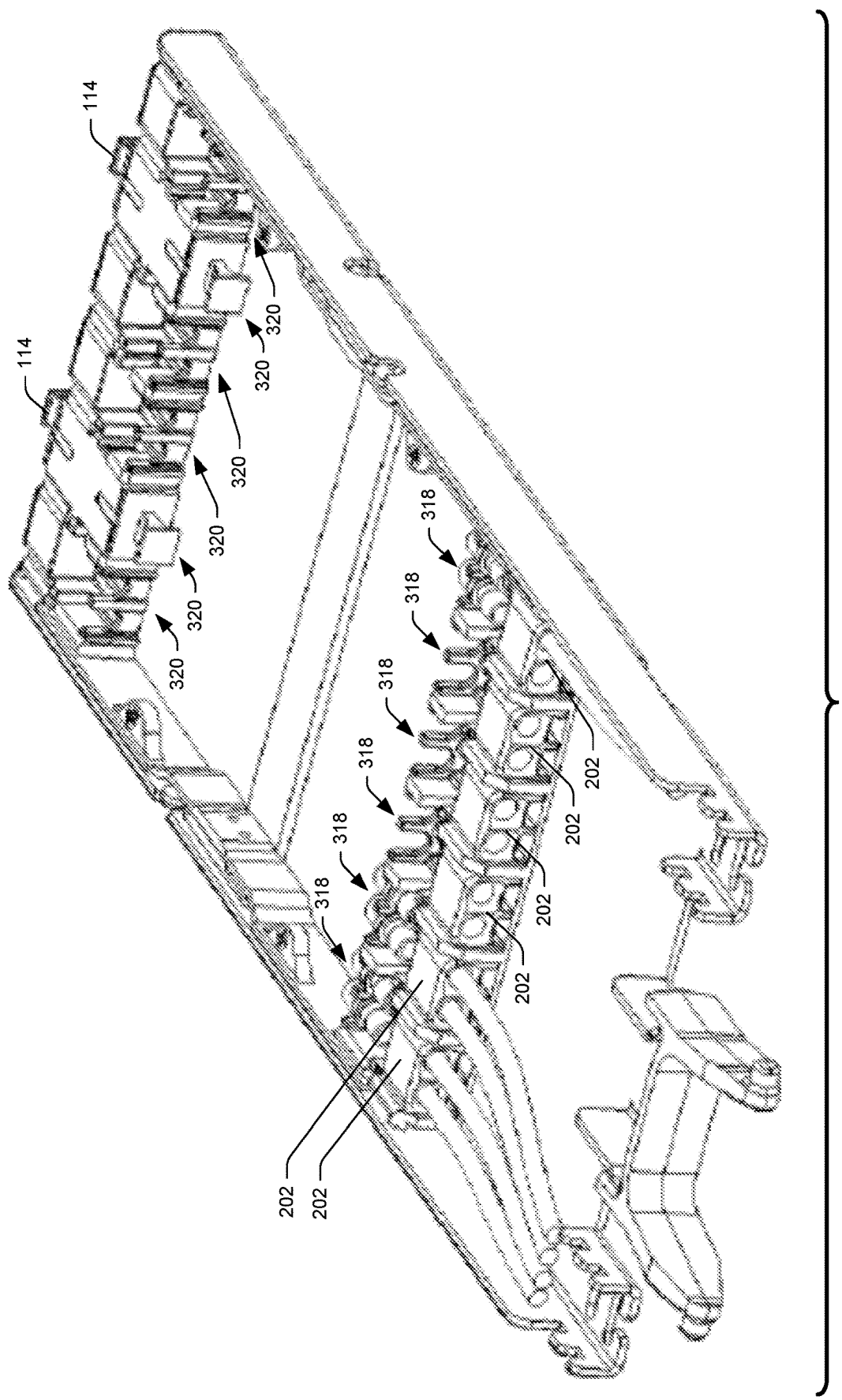
FIG. 5 illustrates another example assembled view of the data communication system illustrated in FIG. 3 according to an embodiment of this disclosure.

FIG. 5 illustrates another example assembled view 500 of the data communication system 200 illustrated in FIG. 3 according to an embodiment of this disclosure. FIG. 5 illustrates the tray 110 releasably engaged with the cassette 112, the first plurality of receptacles 318 fastening the plurality of optical fiber interfaces 202, and the second plurality of receptacles 320 fastening the plurality of test ports 114.

The plurality of optical fiber interfaces 202 may include a plurality of strain relief passthroughs. The plurality of test ports 114 may include a plurality of LC connectors. The LC connectors may be pre-terminated LC connectors. For example, the LC connectors may be pre-terminated at a time of manufacturing the cassette 112 at a facility. While FIG. 5 illustrates the plurality of optical connectors including a plurality of LC connectors, the plurality of connectors may include a plurality of other connectors. For example, the plurality of connectors may be SC connectors. The SC connectors may be pre-terminated SC connectors. For example, the SC connectors may be pre-terminated at a time of manufacturing the cassette 112 at a facility. The plurality of test ports 114 may include a plurality of course wavelength division multiplexing (CWDM) test ports. While FIG. 5 illustrates the plurality of test ports 114 may include a plurality of course wavelength division multiplexing (CWDM) test ports, other test ports are contemplated. For example, the plurality of test ports 114 may include a plurality of dense wavelength division multiplexing (DWDM) test ports.

Figure 6:
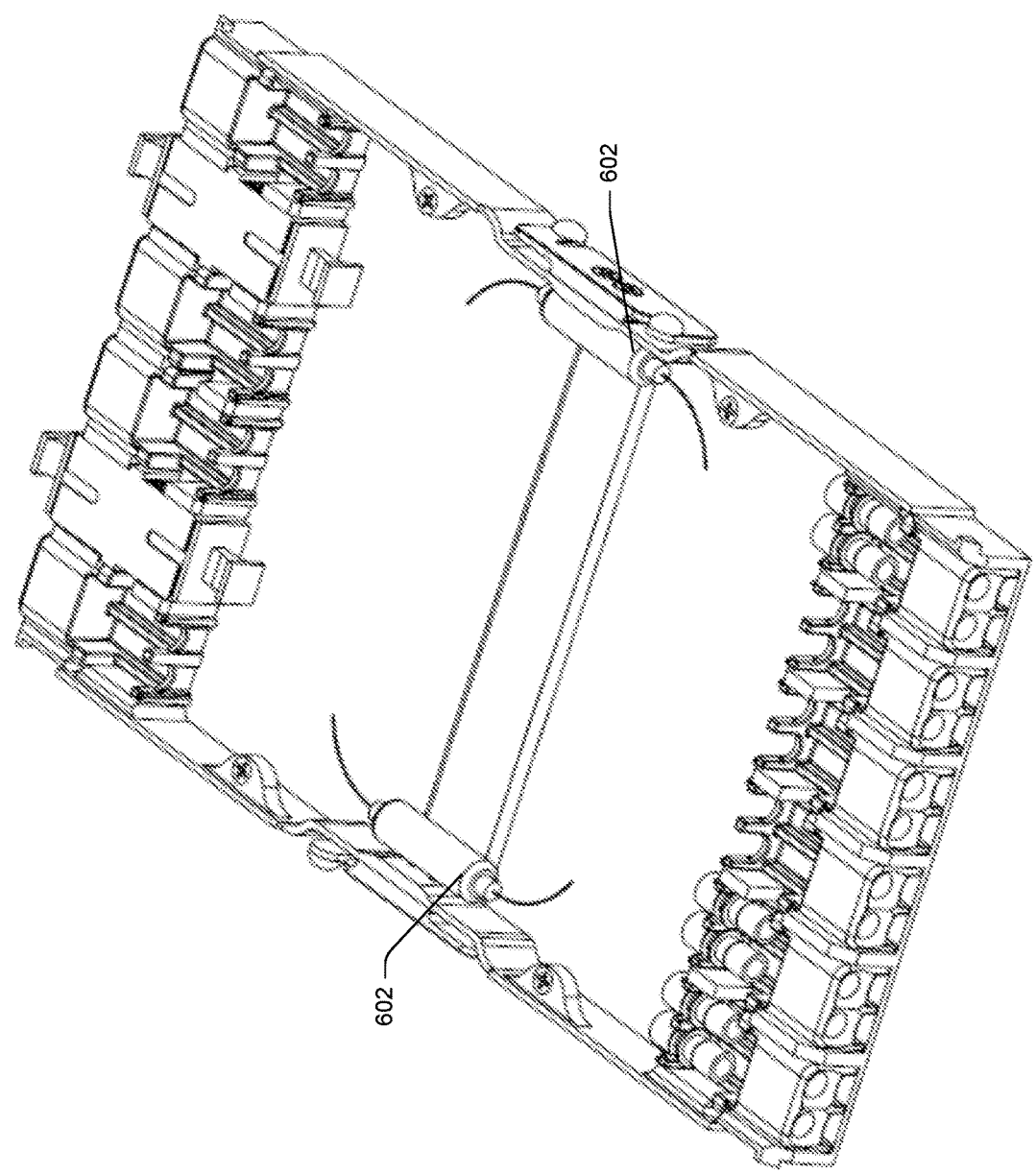
FIG. 6 illustrates another example assembled view of the data communication system illustrated in FIG. 3 according to an embodiment of this disclosure.

FIG. 6 illustrates another example assembled view 600 of the data communication system 200 illustrated in FIG. 3 according to an embodiment of this disclosure. FIG. 6 illustrates the tray 110 releasably engaged with the cassette 112. FIG. 6 illustrates filters 602 (e.g., wavelength management filters, coarse wavelength division multiplexing (CWDM) filters, dense wavelength division multiplexing (DWDM) filters, etc.) disposed in the cassette 112. While FIG. 6 illustrates two filters 602 disposed in the cassette 112, any number of filters 602 may be disposed in the cassette 112. For example, the number of filters 602 disposed in the cassette 112 may vary depending on a configuration of the data communication system 200.

Conclusion

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A data communication system for deploying outside plant fiber optics, the data communication system comprising:
a first tray moveably disposed in an inside of an enclosure, the enclosure including one or more second trays moveably disposed in the inside of the enclosure; and
a cassette disposed in the first tray, the cassette having a first end opposite a second end, the first end of cassette having a first geometry symmetrical, about at least one axis, to a second geometry of the second end of the cassette, the cassette further including:
a first connector fastening station arranged in the first end of the cassette, the first connector fastening station including a first plurality of receptacles to fasten, respectively, a plurality of optical fiber interfaces, and
a second connector fastening station arranged in the second end of the cassette, the second connector fastening station including a second plurality of receptacles to fasten, respectively, a plurality of test ports including:
an LC connector,
an SC connector,
a coarse wavelength division multiplexing (CWDM) test port, or
a dense wavelength division multiplexing (DWDM) test port,
wherein, when the first tray and the one or more second trays are moveably disposed in the inside of the enclosure, the plurality of test ports are accessible without moving the first tray and without moving the one or more second trays.

2. The data communication system of claim 1, wherein each optical fiber interface of the plurality of optical fiber interfaces is sized to receive a respective bundle of optical fibers.

3. The data communication system of claim 1, wherein the first plurality of receptacles of the first connector fastening station are symmetrical, about the at least one axis, to the second plurality of receptacles of the second connector fastening station.

4. A data communication system for deploying outside plant fiber optics, the data communication system comprising:
a tray having a first end opposite a second end, and a first side opposite a second side, the first side of the tray extending between the first end of the tray and the second end of the tray, the second side of the tray extending between the first end of the tray and the second end of the tray, and the tray including:
a first locking mechanism on the first side of the tray, and
a second locking mechanism on the second side of the tray;
a cassette releasably engaged in the tray, the cassette having a first end opposite a second end, the first end of the cassette having a first geometry symmetrical, about at least one axis, to a second geometry of the second end of the cassette, and a first side opposite a second side, the first side of the cassette extending between the first end of the cassette and the second end of the cassette, the second side extending between the first end of the cassette and the second end of the cassette, and the cassette including:
a first locking mechanism on the first side of the cassette,
a second locking mechanism on the second side of the cassette,
wherein the first locking mechanism on the first side of the tray is releasably engageable with the first locking mechanism on the first side of the cassette, and the second locking mechanism on the second side of the tray is releasably engageable with the second locking mechanism on the second side of the cassette,
a first connector fastening station arranged in the first end of the cassette, the first connector fastening station including a first plurality of receptacles, and the first plurality of receptacles fastening a plurality of optical fiber interfaces, and
a second connector fastening station arranged in the second end of the cassette, the second connector fastening station including a second plurality of receptacles, and the second plurality of receptacles fastening a plurality of test ports.

5. The data communication system of claim 4, further comprising:
an enclosure including a tray fastening member disposed in an inside of the enclosure; and
a hinge member,
wherein a connecting member disposed at the first end of the tray attaches to the hinge member for pivotably connecting to the tray fastening member of the enclosure.

6. The data communication system of claim 5, wherein the hinge member is a first hinge member,
wherein the system further comprises a second hinge member, the first hinge member being different than the second hinge member,
wherein the enclosure is a first type of enclosure,
wherein the system further comprises a second type of enclosure, the first type of enclosure having a lower tray housing capacity than the second type of enclosure having a higher tray housing capacity than the first type of enclosure,
wherein the tray fastening member is a first tray fastening member,
wherein the system further comprises a second tray fastening member, the first tray fastening member disposed in the inside of the first type of enclosure smaller than the second tray fastening member disposed in an inside of the second type of enclosure, and
wherein the first hinge member attaches to the connecting member of the tray for pivotably connecting to the first tray fastening member of the first type of enclosure, and the second hinge member attaches to the connecting member of the tray for pivotably connecting to the second tray fastening member of the second type of enclosure.

7. The data communication system of claim 4, wherein the first locking mechanism on the first side of the cassette is a single unit of material and is fastened on the first side of the cassette, or
wherein the second locking mechanism on the second side of the cassette is a single unit of material and is fastened on the second side of the cassette.

8. The data communication system of claim 4, wherein:
one or more of the first plurality of receptacles are configured to fasten to at least one of a first connector, a first adapter, a first plug, or a first strain relief unit, and
one or more of the second plurality of receptacles are configured to fasten to at least one of a second connector, a second adapter, a second plug, or a second strain relief unit.

9. The data communication system of claim 4, wherein each optical fiber interface of the plurality of optical fiber interfaces is sized to receive a respective bundle of optical fibers.

10. The data communication system of claim 4, wherein at least one test port of the plurality of test ports includes an LC connector.

11. The data communication system of claim 4, wherein at least one test port of the plurality of test ports includes an SC connector.

12. The data communication system of claim 4, wherein at least one test port of the plurality of test ports includes a coarse wavelength division multiplexing (CWDM) test port, or the at least one test port of the plurality of test ports includes a dense wavelength division multiplexing (DWDM) test port.

13. The data communication system of claim 4, wherein the first plurality of receptacles of the first connector fastening station are symmetrical, about the at least one axis, to the second plurality of receptacles of the second connector fastening station.

14. A data communication system for deploying outside plant fiber optics, the data communication system comprising:
a tray moveably connectable to a tray fastening member disposed in an inside of an enclosure, a height of the tray ranging from 0.4 inches to 0.6 inches; and
a cassette disposed in the tray, the cassette having a first end opposite a second end, the first end of the cassette having a first geometry symmetrical, about at least one axis, to a second geometry of the second end of the cassette, and a height of the cassette ranging from 0.4 inches to 0.6 inches, the cassette including:
a first connector fastening station arranged in the first end of the cassette, the first connector fastening station including a first plurality of receptacles, and the first plurality of receptacles fastening a plurality of optical fiber interfaces, and
a second connector fastening station arranged in the second end of the cassette, the second connector fastening station including a second plurality of receptacles, and the second plurality of receptacles fastening a plurality of test ports including:
an LC connector,
an SC connector,
a coarse wavelength division multiplexing (CWDM) test port, or
a dense wavelength division multiplexing (DWDM) test port.

15. The data communication system of claim 14, wherein:
the tray has a first end opposite a second end, and a first side opposite a second side, the first side of the tray extending between the first end of the tray and the second end of the tray, the second side of the tray extending between the first end of the tray and the second end of the tray, and the tray including:
a first locking mechanism on the first side of the tray, and
a second locking mechanism on the second side of the tray; and
the cassette has a first end opposite a second end, and a first side opposite a second side, the first side of the cassette extending between the first end of the cassette and the second end of the cassette, and the second side extending between the first end of the cassette and the second end of the cassette, the cassette including:
a first locking mechanism on the first side of the cassette, and
a second locking mechanism on the second side of the cassette,
wherein the first locking mechanism on the first side of the tray is releasably engageable with the first locking mechanism on the first side of the cassette and the second locking mechanism on the second side of the tray is releasably engageable with the second locking mechanism on the second side of the cassette.

16. The data communication system of claim 14, further comprising a hinge member,
wherein the tray further includes a connecting member disposed on the first end of the tray, the connecting member attachable to the hinge member for pivotably connecting to the tray fastening member disposed in the inside of the enclosure.

17. The data communication system of claim 1, further comprising:
a tray fastening member disposed in an inside of the enclosure; and
a hinge member,
wherein a connecting member disposed at the first end of the first tray attaches to the hinge member for pivotably connecting to the tray fastening member of the enclosure.

18. The data communication system of claim 17, wherein the hinge member is a first hinge member,
wherein the system further comprises a second hinge member, the first hinge member being different than the second hinge member,
wherein the enclosure is a first type of enclosure,
wherein the system further comprises a second type of enclosure, the first type of enclosure having a lower tray housing capacity than the second type of enclosure having a higher tray housing capacity than the first type of enclosure,
wherein the tray fastening member is a first tray fastening member,
wherein the system further comprises a second tray fastening member, the first tray fastening member disposed in the inside of the first type of enclosure smaller than the second tray fastening member disposed in an inside of the second type of enclosure, and
wherein the first hinge member attaches to the connecting member of the first tray for pivotably connecting to the first tray fastening member of the first type of enclosure, and the second hinge member attaches to the connecting member of the first tray for pivotably connecting to the second tray fastening member of the second type of enclosure.

19. The data communication system of claim 1, further comprising a connecting member disposed on the first end of the first tray, the connecting member attachable to a hinge member for pivotably connecting to a tray fastening member disposed in the inside of the enclosure.

20. The data communication system of claim 14, wherein the first plurality of receptacles of the first connector fastening station are symmetrical, about the at least one axis, to the second plurality of receptacles of the second connector fastening station.

* * * * *